United States Patent [19]

Jones

[11] Patent Number: 5,002,817

[45] Date of Patent: Mar. 26, 1991

[54] FORM LINER AND METHOD FOR FORMING CONCRETE PANELS WITH ARTISTIC RELIEF PATTERNS

[76] Inventor: Robert L. Jones, 31752 Los Rios, San Juan Capistrano, Calif. 92675

[21] Appl. No.: 516,566

[22] Filed: Apr. 30, 1990

[51] Int. Cl.[5] .................... B32B 3/26

[52] U.S. Cl. .................... 428/159; 156/344; 249/189; 428/319.1; 428/703

[58] Field of Search .................... 428/159, 319.1, 703; 249/189; 156/344

[56] References Cited

U.S. PATENT DOCUMENTS 3,515,779 6/1970 Jones .................... 264/51

3,702,180 11/1972 Jones .................... 264/51

3,844,527 10/1974 Scott .................... 249/189

*Primary Examiner*—William J. Van Balen

*Attorney, Agent, or Firm*—Plante, Strauss, Vanderburgh & Connors

[57] ABSTRACT

There is disclosed a form liner having a thickness no greater than 0.5 inch and having planar dimensions of approximately 2 feet by 4 feet, with one of its planar surfaces having a molded negative impression of a desirable surface relief pattern for a concrete wall. The form liner is manufactured by processing pre-formed sheets or panels of expanded plastic foam, typically expanded polystyrene foam. These stock panels are obtained in approximately ⅜ inch thickness and a positive pattern of the desired relief is pressed into the panel under sufficient heat, about 200 degrees F. and pressure, about 2500 psi, to mold one of the smooth surfaces of the panel into a negative impression of the desired surface relief pattern. The molding can be accomplished in a standard compression equipment with cycle times of approximately ten seconds. This permits the inexpensive and facile manufacture of these panels at sites removed from the polystyrene foam expander plant.

20 Claims, 3 Drawing Sheets

FORM LINER AND METHOD FOR FORMING CONCRETE PANELS WITH ARTISTIC RELIEF PATTERNS

BACKGROUND OF THE INVENTION

1. Field of Invention

This invention relates to a method and a form liner useful in the method for imparting an artistic surface relief pattern to a concrete wall.

2. Brief Statement of the Prior Art

Concrete wall construction is typically accomplished by a poured in place method in which vertical concrete containing forms are fabricated at the location for the wall, and the concrete is poured into the forms. The concrete hardens sufficiently to permit the forms to be removed within one day. A more popular method, particularly in southern climates of this country is the tilt-up method, in which concrete containing forms are fabricated on a horizontal floor, the concrete is poured into the form. After the concrete has hardened and cured for approximately a week, the forms are stripped and the walls are lifted, or tilted, into place. Typically, in this construction, the concrete foundation and floor for a building are constructed and the concrete retaining forms to construct the walls of the building are framed and on the floor. The aforementioned construction methods are used predominately for industrial buildings such as factories and warehouses. Concrete walls have been used to a limited extent for office building construction, however the starkness and unrelieved texture of most concrete walls has discouraged its wide application for office buildings.

Attempts have been made to impart an artistic relief to walls formed in this manner. One attempt which has been used in various applications has been lining of the concrete retaining forms with foamed plastic liners, rigid sheets of plastic foam which have one surface relieved with a negative impression of the desired relief in the concrete. These liners are placed on the floor of the building within the perimeter frame for the walls and concrete is poured into the perimeter frame for the walls and concrete is poured into the perimeter frame and over the foamed plastic form liners. After the concrete has cured and the walls are tilted into a vertical position, and the form liners are stripped from the wall leaving a surface relief texture or pattern on the exterior surface of the wall.

One technique for fabricating the plastic foam form liners has been machine or hand carving of the plastic foam. Various carving tools have been used such as a hot wire, knife, router and the like. The difficulty with this approach is that the carving of the form liners unavoidably forms a surface having a multiplicity of voids and broken plastic foam beads. The voids and broken beads capture the concrete and tenaciously adhere to the concrete after curing. As a consequence, it is difficult to strip the form liners from the concrete wall and the form liners must be demolished and residues of the liner must be washed from the wall with solvent. In my prior U.S. Pat. Nos. 3,515,779 and 3,702,180, I disclose and claim the use of molded plastic foam form liners. In this application, the foam liners are formed by the expansion of polystyrene beads in a conventional steam chest, against a metal mold that has a positive pattern of the desired relief. This method is superior to the aforementioned carving method for preparing the form liners since the surface of the form liners is smooth and the form liners do not adhere so tenaciously to the concrete wall. The disadvantages of this method, however, are that the liners must be fabricated with relatively expensive or sophisticated equipment using metal molds which are quite costly. Also, even though these liners do not adhere as tenaciously to the concrete wall as carved liners, their adhesion is sufficient to require that the molded foam liner be at least one inch in thickness to avoid excessive breakage or fragmentation of the liners when they are stripped from the concrete wall. This requirement that the liner be at least one inch in thickness increases the expense because of the substantial amount of material required and because it requires that the retaining wall for the concrete be built up with additional furring strips. Most tilt-up construction requires concrete walls seven inches in thickness. These walls are formed using retaining forms constructed with conventional dimensional lumber of 2 inches by 8 inches. This lumber is actually 7.5 inches in width, and there is only a tolerance of 0.5" in the height of the retaining form. The form is thus not sufficiently high to provide a concrete wall of a minimum of 7" in the thickness using the form liners. As a consequence, furring strips must be laid along the retaining forms to increase their height, a labor intensive requirement.

OBJECTIVES OF THE INVENTION

It is an objective of this invention to provide a form liner for efficient and inexpensive construction of concrete walls having artistic surface relief patterns.

It is also an object of this invention to provide a form liner for concrete wall construction having a thickness no greater than 0.5 inch.

It is also a further object of this invention to provide a form liner for concrete wall construction which strips from the concrete wall more readily than previously used form liners.

It is a further object of this invention to provide an improved method for the formation of molded surface form liners for concrete wall construction.

It is an additional object of this invention to provide a method for imparting three dimensional relief to a concrete wall more efficiently and less costly than prior methods.

Other and related objects will be apparent from the description of the invention.

BRIEF STATEMENT OF THE INVENTION

This invention comprises a molded form liner having a thickness no greater than 0.5 inch and having planar dimensions of approximately 2' by 4' with one of its planar surfaces having a molded negative impression of a desirable surface relief pattern for a concrete wall. The invention also comprises the method of forming this foam liner and using the foam liner in the construction of a concrete wall. The form liner is manufactured according to the invention by processing pre-formed sheets or panels of expanded plastic foam, typically expanded polystyrene foam. These stock panels are obtained at approximately ⅜ inch thickness and are subjected to the application of a positive pattern mold of the desired relief pattern under sufficient heat, about 200 degrees F. and pressure, about 2500 psi, to mold one of the smooth surfaces of the panel into a negative impression of the desired surface relief pattern. The molding can be accomplished in a standard compression equipment with cycle times of approximately ten seconds. This permits the inexpensive and facile manufacture of these panels at sites removed from the polystyrene foam expander plant. Surprisingly it has been found that polystyrene panels formed in this manner do not warp as a result of the treatment and that these panels have a lessor adhesion to concrete than even that possessed by the foam liners which previously had been molded by expansion of the polystyrene beads in conventional steam chests. As a consequence, the form liners can be reduced significantly in thicknesses and very useful foam liners having thicknesses of ⅜" can be used and readily stripped without fragmentation from a concrete wall, thereby permitting the use of standard dimension 2 inch×8 inch lumber for the perimeter frame in casting the concrete wall.

BRIEF DESCRIPTION OF THE DRAWINGS

The invention will be described with reference to the figures of which.

DESCRIPTION OF PREFERRED EMBODIMENT

Figure 1:
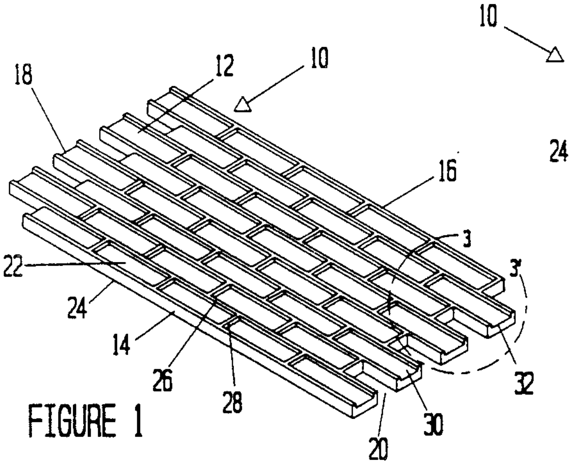
FIG. 1 is a perspective view of the molded form liner of the invention showing the molded planar surface.

Referring now to FIG. 1, there is illustrated a form liner 10 according to the invention. As there illustrated, the form liner 10 is intended for use to impart a surface brick texture to a poured concrete wall. Other and more artistic or aesthetically pleasing patterns can be obviously used; the illustrated pattern 12 is selected for ease of illustration. As shown in FIG. 1, the form liner 10 of the invention is a very thin planar sheet having side edges 14 and 16 and opposite end edges 18 and 20 and opposite planar surfaces 22 and 24. The illustrated planar surface 22 bears a negative impression 12 of the desired surface relief pattern for the concrete wall. The pattern 12 comprises a plurality of longitudinal ribs 26 which are intersected by a plurality of discontinuous and offset transverse ribs 28 extending between each of the longitudinal ribs 26. The depth of the relief can be varied, depending on the particular pattern, from about 0.067 to about 0.5 inch, most preferably from about 0.125 to about 0.375 inch. The surface relief should be about 0.067 to 0.125 inch less than the thickness of the plastic foam panel. Accordingly, with the preferred panel thickness of 0.375 inch, the surface relief will have a depth from 0.067 to about 0.30 inch, preferably 0.125 to 0.25 inch.

Figure 2:
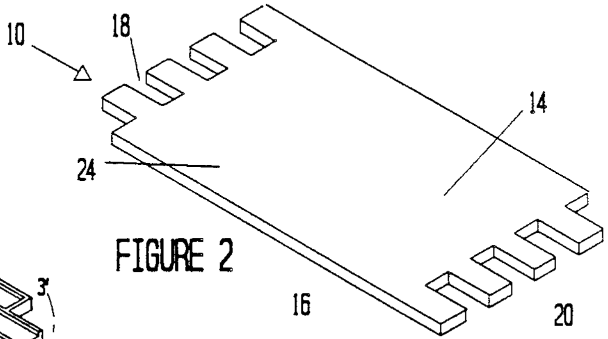
FIG. 2 is a perspective view of the opposite planar surface of the form liner.

As shown by FIG. 2, the opposite or reverse surface 24 of the form liner 10 is smoothly surfaced as characteristic of planar surfaces of the sheet stock which is used in its fabrication.

Figure 3:
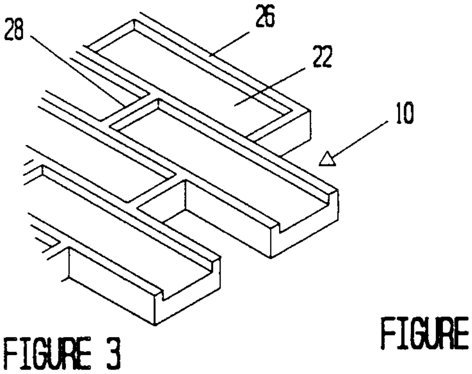
FIG. 3 is an enlarged view of the area within line 3—3' of FIG. 1.

As more readily apparent from FIG. 3, each of the longitudinal ribs 26 and transverse ribs 28 extends from the surface 22 of the liner 10. Each of these ribs forms a simulated grout line in the completed wall to create a simulation of a brick wall.

Referring again to FIG. 1, the end edges 18 and 20 of the form liner 10 are cut with a scalloped shape with inset slots 30 that are spaced between tongues 32, terminating at each simulated transverse grout line, thereby providing for interlocking of the form liners end-to-end resulting in construction of a continuous wall with no apparent clue to its method for manufacture.

Figure 4:
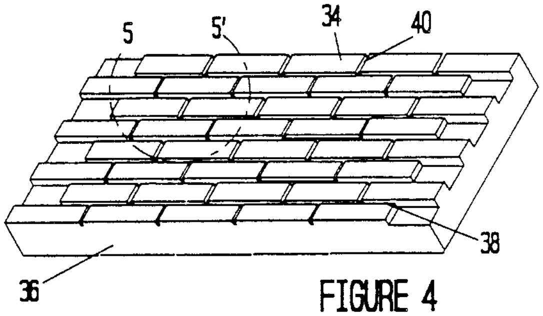
FIG. 4 is a perspective view of the pattern face of the mold used to manufacture the form liners of the invention.

As previously mentioned, the molded form liners of the invention are manufactured using a metal mold which bears a positive pattern in the desired relief pattern for the concrete wall. FIG. 4 is a perspective view of the pattern face 34 of the manufacturing mold 36. As there illustrated, the pattern face 34 has a plurality of longitudinal grooves 38, each corresponding in placement and dimensions, i.e., depth and width, to a simulated grout line. These longitudinal grooves 38 are intersected by a plurality of discontinuous and staggered transverse grooves 40 which likewise simulate the transverse grout lines between individual bricks.

Figure 5:
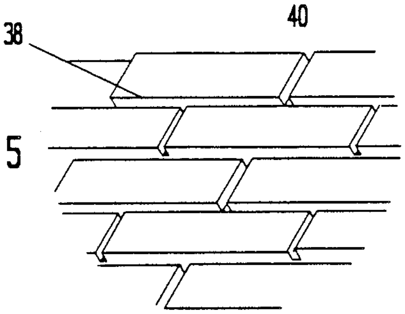
FIG. 5 is an enlarged view of the area within line 5—5' of FIG. 4.

As apparent from FIG. 5, the grooves 38 and 40 to form the simulated grout lines have a suitable depth, e.g., 0.067 to about 0.50 inches, preferably from about 0.125 to about 0.250 inches, beneath the planar surface of the manufacturing mold 36.

Figure 6:
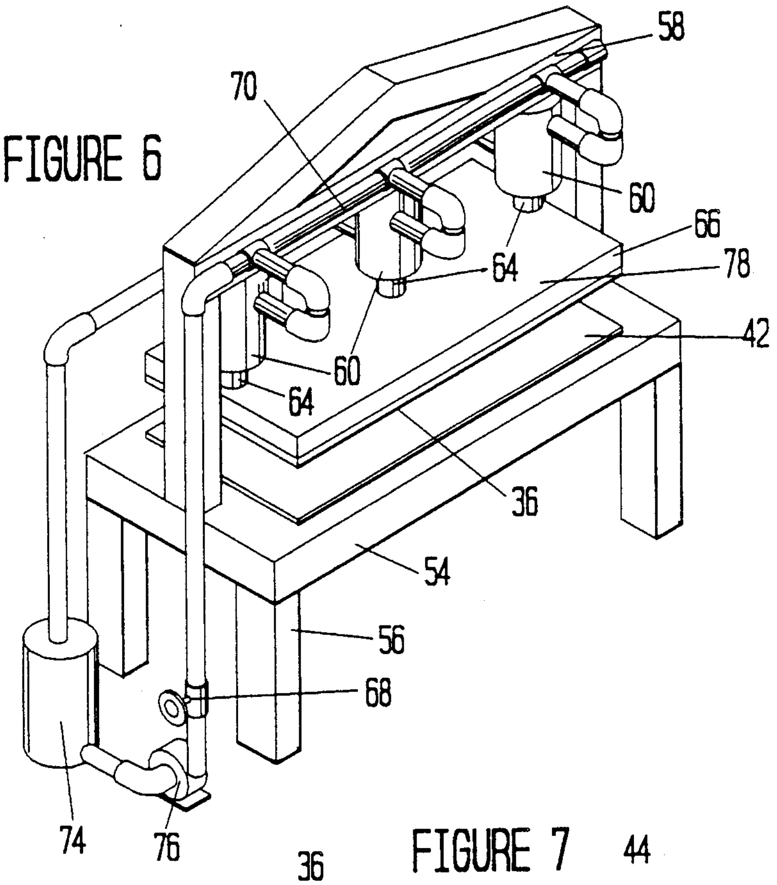
FIG. 6 is a view of the surface opposite the pattern surface of the manufacturing mold shown in FIG. 4.

The manufacturing mold 36 is applied to a smooth surfaced plastic foam sheet 42 with heat and pressure. As shown in FIG. 6, which illustrates the surface 44 of the manufacturing mold which is opposite from its pattern face, a plurality of electrical resistant heaters 46 are located across the opposite surface of the manufacturing mold 36, and these heaters are interconnected with electrical power supply conduit 48. The heating of the mold 36 is controlled by one or more thermostatic switches 50 which are located strategically in the manufacturing mold 36 and which control the supply of electrical power to the conduits 48.

Figure 7:
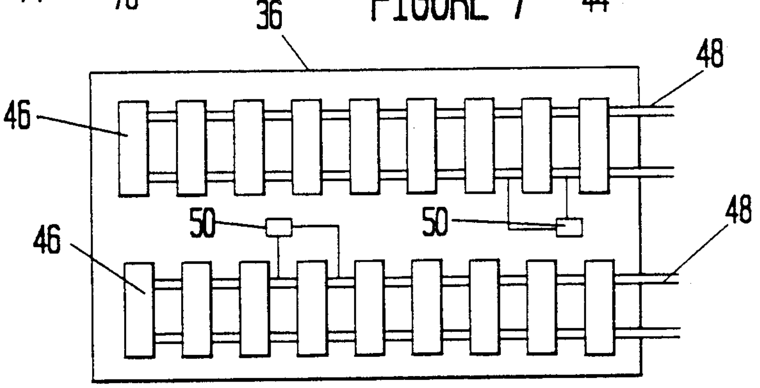
FIG. 7 is a perspective view of the press used to manufacture the form liners of the invention.

Referring now to FIG. 7, there is illustrated a perspective view of a manufacturing press 52 suitable for use in the invention. As there illustrated, the press 52 has a horizontal table 54 supported by conventional corner posts 56 and has an overhead rail 58 from which extend several hydraulic cylinders 60. For ease of illustration, the hydraulic cylinders and hydraulic lines are shown enlarged, out of proportion to the size of the table.

Each of the hydraulic cylinders 60 has a conventional internal piston (not shown) with a piston rod 64 secured to a movable platen 66 of the hydraulic press 52. The hydraulic cylinders 60 are provided with conventional valves 68 to supply hydraulic fluid from the pressure supply line 70 to each of the cylinders 60 and to return hydraulic fluid through line 72 to the storage reservoir 74. The press has a conventional hydraulic pump 76 to pressure the fluid sufficiently for operation of the press.

The platen 66 is preferably reinforced to prevent warping or distortion during use with a plurality of stiffeners or ribs 78 that extend longitudinally and laterally across the upper surface 80 of the platen 66.

In practice, the manufacturing mold 36 such as illustrated in FIGS. 4–6 is secured to the underside of the platen 66 with the positive pattern face directed downwardly towards the top surface of the table 54 of the press 53. The sheet 42 of rigid plastic foam having a thickness less than 0.5 inch and, preferably about 0.375 inch, is laid on the surface of the work table 54, beneath the movable platen 66. The valves 68 are opened to supply hydraulic fluid from the pump 76 and reservoir 74 and the electrical heaters 46 (see FIG. 6) of the manufacturing mold 66 are activated to heat the mold to the desired temperature.

The molding conditions which have been found suitable for the molding of sheet stock of expanded polystyrene beads include a temperature from about 175° F. to 225° F., preferably from 190° F. to 210° F. The manufacturing mold is applied to the foam plastic sheet at a pressure from about 1500 to about 3000, preferably about 2000, pounds per square inch (psi). The heated manufacturing mold is applied to the exposed top surface of the foam sheet stock for a time that is sufficient to form a permanent negative impression of the desired relief. This has been found to require a time from about 5 to 15 seconds, preferably about 10 seconds.

I have observed that the aforementioned conditions will impart to the surface of a rigid plastic foam a permanent and stable negative impression of the desired relief up to 0.5 inches in depth without heating the body of the foam to a temperature sufficient to relieve the foam and permit its warping or distortion. In this regard, the high thermal insulation value of the plastic foam is advantageous as it isolates the applied heat and localizes it on the receiving surface of the foam stock.

The aforementioned hydraulic press is readily available from various commercial suppliers at very economical prices. Additionally, the manufacturing mold for casting the relief pattern in the foam sheet stock can be fabricated for a fraction of the cost of a manufacturing mold used for expansion of polystyrene beads such as described in my previously identified prior patents.

Figure 8:
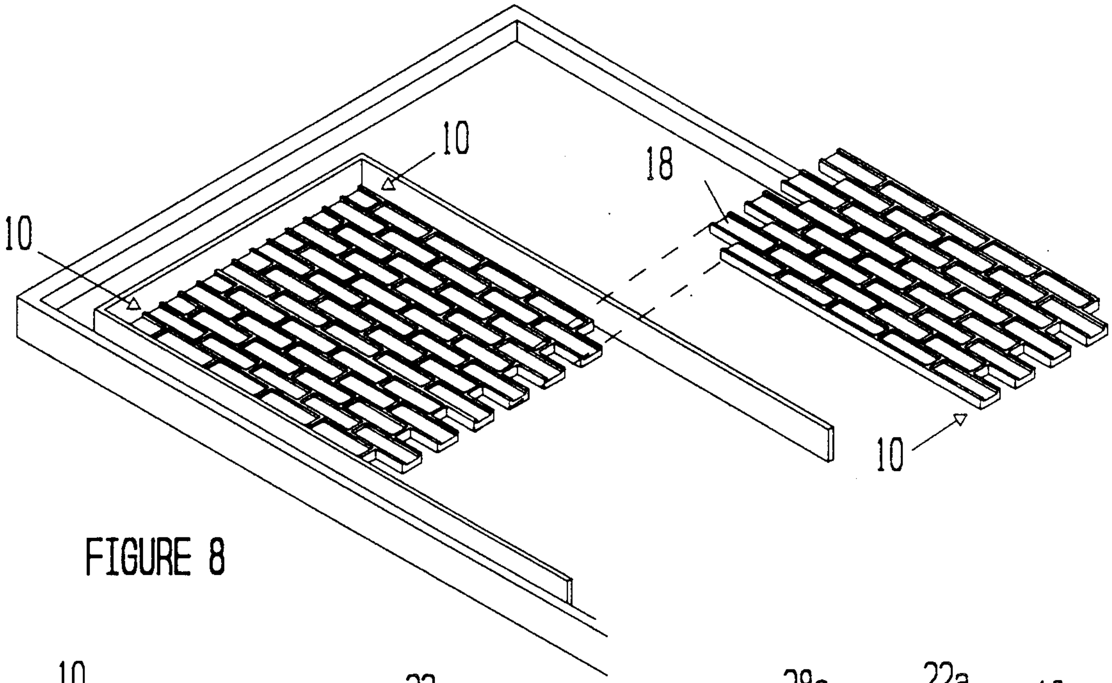
FIG. 8 is a perspective view of a concrete retaining form with the form liners of the invention.

Referring now to FIG. 8, the use of the form liners in casting of a concrete wall will be described. As there illustrated, a building is under construction and the foundation 82 and floor 84 of the building have been cast and the concrete cured. Thereafter, retaining forms for construction of the tilt up concrete walls are fabricated on the floor of the building. These retaining forms 90 are constructed with conventional 2 inch×8 inch dimensional lumber and comprise end walls 86 and longitudinal walls 88 which are interconnected to form the perimeter retaining form 90. The form liners of the invention are located at preselected areas or across the entire floor contained within the retaining foam. As illustrated in FIG. 8, the liners 10 are applied to the surface and interlocked end-to-end to provide a continuous patterned surface 92 across the bottom of the retaining form. In the illustration, the liner 10A is to be placed into the form as shown by the phantom lines.

Preferably, the pattern surfaces of the form liners are coated with a parting agent. The parting agent which is preferred is commercially available as AQUA FORM, from MAINTEX, 13300 East Nelson Ave., City of Industry, California 91744. The parting agent is a water soluble concrete retardant which is sprayed onto the pattern surfaces of the liners, after they have been assembled in the concrete retaining form. The resulting coating is permitted to dry before the concrete is poured. Once the parting agent coating has dried, the concrete is poured into the retaining form over the surfaces of the form liners and is screeded at the appropriate height to provide a minimum unrelieved wall thickness of seven inches, as required by the construction code for the strength desired in the wall.

The concrete is permitted to cure and, after curing for approximately one to three days, the retaining forms are removed and the wall is tilted into a vertical position, frequently with the use of a crane which can carry the wall to its precise desired location. When the liners are used in a poured-in-place concrete form, i.e., a vertical form, the form can be removed after one day of curing, and the liners can be stripped immediately after removal of the form. In this application, the liners will separate from the concrete wall, without any significant wear or damage, and can be reused, if desired.

In the illustrated, tilt-up construction, the walls of the building are erected and secured, and the foam liners of the invention are stripped from the walls. This is readily accomplished using a hydraulic or pneumatic lance which simply comprises a tubular member preferably supplied with air pressure but is pushed through the form liners to discharge compressed air between the liners and the concrete wall surface, popping the foam liners from place.

I have observed that form liners as thin as ¼" in and with dimensions of 2 feet by 4 feet can be readily separated in this fashion without a substantial fragmentation, thereby permitting the very fast and economic production of a concrete wall with a molded artistic pattern. I have also observed that when the liners of this invention are stripped from the concrete within one to two days after the concrete has been poured, the liners can be reused, as there is no significant damage to their surfaces. This is particularly of advantage when the liners are used as liners within a poured in place vertical mold, as these molds are typically stripped from the concrete within one day of pouring the concrete.

Figure 9:
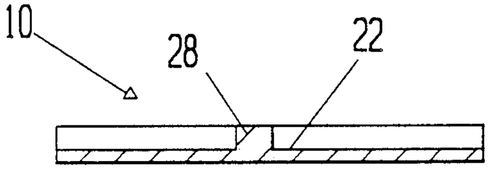
FIG. 9 is a sectional view through a liner of this invention.
Figure 10:
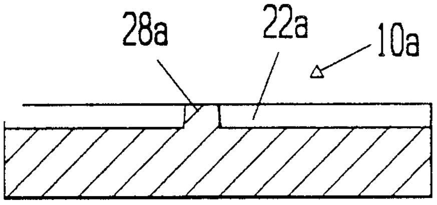
FIG. 10 is a sectional view through a liner prepared by the invention of my prior patents.

The form liners prepared in accordance with this invention also can be obtained with ribs or surface reliefs which have side walls perpendicular to the surface of the liner. This is shown in FIG. 9 which is a cross section through a typical liner prepared in accordance with the invention. As there illustrated, the ribs 28 have sidewalls which are perpendicular to the surface 22 of the liner 10. This is in contrast to the liners which have been manufactured in accordance with my aforementioned prior patents. A typical cross section of one of those prior liners is shown in FIG. 10. As apparent from that illustration, the side walls of the rib 28a is inclined, as necessary for a draft required in the liner to permit its ejection from the manufacturing mold. Also as apparent, from a comparison of FIGS. 9 and 10, the liners of this invention are substantially thinner, thus saving substantial manufacturing costs.

The interlocking slots and channels along the opposite end edges of the foam panels can be fabricated by any suitable means. If desired these can be formed by die stamping of the individual sheets with a suitable cutting die and a press. Alternatively, these edges can be cut with a laser cutting device. In this technique, a plurality of the form liners, either before or after their surfaces have been formed with a negative pattern of the desired relief are assembled in a laser cutting machine and a laser beam is applied to cut the end edges all of the liners in the stack.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A liner for transferring a three dimensional pattern to a concrete surface which comprises:
   a. a planar sheet formed entirely of expanded polystyrene foam and having a thickness less than ½ inch with opposite planar surfaces;
   b. a negative impression of said three dimensional pattern molded into one of said planar surfaces of said planar sheet by the application to one of said surfaces of a positive impression of said three dimensional pattern at a temperature from about 175° to 225° F. and pressure from about 2000 to 3500 psi and time sufficient to permanently deform said one surface into said negative impression.

2. The liner of claim 1 having a thickness no greater than ⅜ inch.

3. The liner of claim 2 having width and length dimensions from 1 to about 8 feet.

4. The liner of claim 3 having width and length dimensions about 2 feet by 4 feet.

5. The liner of claim 1 wherein said negative pattern is molded at a temperature from 190° to 210° F.

6. The liner of claim 1 wherein said planar sheet has a density of from 0.75 to 3 pounds per cubic foot.

7. The liner of claim 1 wherein said planar sheet has a density of about 1 pound per cubic foot.

8. The liner of claim 1 wherein said liner is molded by the application of said positive pattern for a period of 5 to about 20 seconds.

9. The liner of claim 1 wherein said pressure applied to said liner is from 2500 to 3000 psi.

10. The liner of claim 1 which is formed with opposite end edges which are scalloped to provide interlocking of adjacent liners.

11. The method of preparing a concrete wall having a surface relief pattern thereon which comprises:
   a. preparing a containment form for concrete on a flat horizontal surface from perimeter members located at the top, bottom and opposite end edges of said wall;
   b. preparing a form liner from a planar sheet of expanded polystyrene foam and having a thickness less than ½ inch with opposite smooth surfaced planar surfaces by molding into one of said smooth surfaced planar surfaces a negative impression of said three dimensional pattern by the application to said one surface of a positive impression of said three dimensional pattern at a temperature from about 175° to 225° F. and pressure from about 2000 to 3500 psi and time sufficient to permanently deform said one surface into said negative impression;
   c. placing and securing said form liner on said flat horizontal surface within said perimeter form;
   d. pouring concrete into said form and over said form liner;
   e. permitting said concrete to cure; and
   f. raising said concrete wall into a vertical position, and stripping said form liner from said wall to expose said surface relief pattern thereon.

12. The liner of claim 11 having a thickness no greater than ⅜ inch.

13. The liner of claim 12 having width and length dimensions from 1 to about 8 feet.

14. The liner of claim 13 having width and length dimensions about 2 feet by 4 feet.

15. The liner of claim 11 wherein said negative pattern is molded at a temperature from 190° to 210° F.

16. The liner of claim 11 wherein said planar sheet has a density of from 0.75 to 3 pounds per cubic foot.

17. The liner of claim 11 wherein said planar sheet has a density of about 1 pound per cubic foot.

18. The liner of claim 11 wherein said liner is molded by the application of said positive pattern for a period of 5 to about 20 seconds.

19. The liner of claim 11 wherein said pressure applied to said liner is from 2500 to 3000 psi.

20. The liner of claim 11 which is formed with opposite end edges which are scalloped to provide interlocking of adjacent liners.

* * * * *